United States Patent [19]

van den Bussche et al.

[11] 4,174,628

[45] Nov. 20, 1979

[54] MARINE RISER MEASURING JOINT

[75] Inventors: Hendrik K. J. van den Bussche; Nicolaas J. van Soldt; Adrianus H. van de Krogt, all of Rijswijk, Netherlands; Willem Drinkwaard, deceased, late of Papendrecht, Netherlands, by Adriana Drinkwaard, née Goossen, personal representative

[73] Assignee: Shell Oil Company, Houston, Tex.

[21] Appl. No.: 923,122

[22] Filed: Jul. 10, 1978

[51] Int. Cl.² ............................................. G01L 5/00
[52] U.S. Cl. .................................. 73/151; 73/141 A; 73/786

[58] Field of Search ..................... 73/786, 151, 141 A, 73/151; 175/5

[56] References Cited

U.S. PATENT DOCUMENTS

| 3,277,969 | 10/1966 | Vincent | 175/5 |
| 3,855,857 | 12/1974 | Claycomb | 73/151 |

*Primary Examiner*—Jerry W. Myracle

[57] ABSTRACT

A marine pipe riser, through which wells may be drilled during offshore drilling operations, is provided with an instrumented section equipped with stress-measuring elements so that loads and stress on the pipe riser may be measured.

6 Claims, 7 Drawing Figures

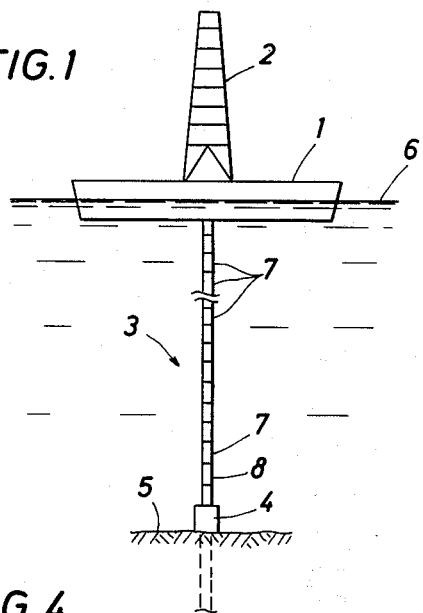
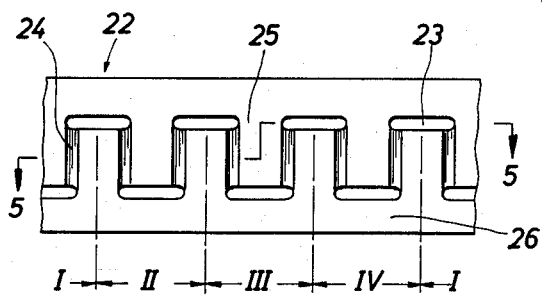
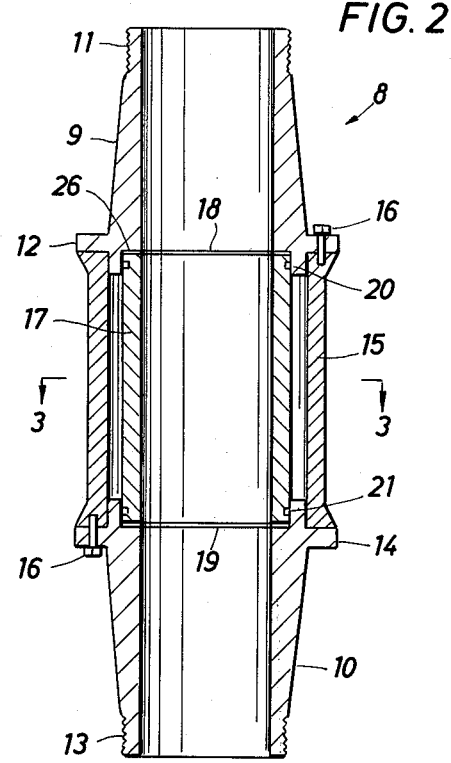
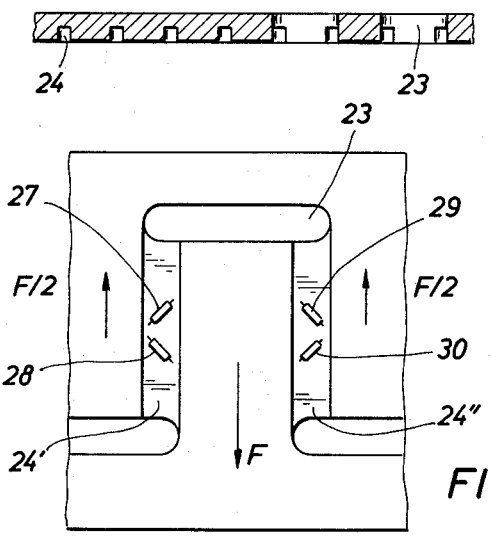
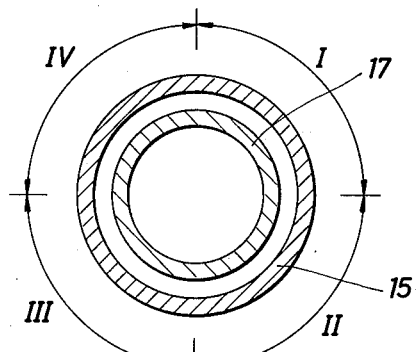

MARINE RISER MEASURING JOINT

BACKGROUND OF THE INVENTION

The invention relates to a marine riser joint and in particular to a marine riser joint for measuring loads exerted on a marine riser.

Drilling boreholes in underground earth formations situated below a body of water may be performed by mounting drilling equipment on a floating vessel, and arranging a marine riser between the vessel and a well-head situated at a level near the sea bottom (or ocean bottom). Such a marine riser consists of a plurality of sections that are interconnected in end-to-end relationship. The sections consist of tubes having a relatively large diameter so that a string of interconnected sections forms a tubular communication between the wellhead and the floating vessel. Tubular equipment (such as a drill string) may be guided from the vessel into the well through this communication, which further forms a return passage for the drilling fluid that has been used in the well.

The lower end of the marine riser is connected to the wellhead. The upper end of the riser is connected to the floating vessel and loaded with an upwardly-directed force to prevent buckling of the riser. A reduction in the magnitude of the required upward force can be obtained by arranging buoyancy members around the sections.

It will be appreciated that the marine riser should preferably extend almost vertically through the water. To achieve this, the vessel is anchored (either by means of sea-anchors or dynamically by the action of propulsion means) to maintain a position that is (as nearly as possible) straight above the well. However, it will be appreciated that conditions may arise, wherein excessive wave or current action on the vessel displaces the vessel in a horizontal direction to an extent which may cause overloading of the marine riser.

To prevent damage of the marine riser, the drilling operator should be continuously informed on the load condition of the marine riser to enable him to take the required steps for counteracting excessive displacement of the floating vessel, or to take any other measures to obviate excessive loads on the marine riser.

Some indication of the load exerted on a marine riser may be obtained by calculating and/or measuring the curvature thereof. Information on the curvature allows the operator (in combination with additional data, such as the upward forces exerted by the buoyancy means, the weight of the marine riser, the lifting force exerted on the marine riser at the upper end thereof) to calculate the stresses in the marine riser at the location(s) where extreme load conditions exist.

SUMMARY OF THE INVENTION

An object of the invention is a more direct way of measuring loads exerted on a marine riser, thus enabling the operator to obtain the required information on the load conditions of the riser almost instantaneously, which information allows him to take the necessary counter measures for load relief of the riser without any delay before these conditions give rise to overloading of the marine riser which would create a situation endangering the drilling operation.

The marine riser joint according to the invention comprises a first and a second tubular element, each element being provided with coupling means such as threads for coupling the joint to and between the ends of sections of the marine riser, a third tubular element extending between the first and second tubular element and in sealing contact therewith near its ends in a manner allowing relative axial displacement between the third element and at least one of the other elements, and a load-transmitting element forming a firm connection between the first and second tubular elements, said load transmitting element being adapted to carry stress measuring elements.

The load-transmitting element may be formed by a fourth tubular element having the wall thereof positioned concentric to the third tubular element, and comprising areas of reduced wall thickness, which areas extend substantially parallel to the axis of the fourth tubular element. Said latter element has openings in the wall thereof, each opening adjoining two of the said areas in a manner such that the said areas are subjected to shearing stresses only when the fourth tubular element is subjected to a tensile load in the direction of the axis thereof. Means may be provided in a plurality of said areas for measuring shearing stress.

The marine riser joint according to the invention allows the operator to measure the load conditions of the marine riser in a manner that is not influenced by the fluid pressure prevailing inside the marine riser. However, if the inner part of the wall of the third tubular element is arranged to be flush with the inner parts of the walls of the first and second tubular elements, means will be provided for measuring the compressive load exerted on the third tubular element. This compressive load results from the fluid pressure inside the joint and equals the axial load on the first and second element raised by the said fluid pressure. The value of the compressive load is to be deducted from the axial load measured in the load-transmitting element.

By measuring the shearing stress in the load-transmitting element, temperature influences on the measuring means may be automatically compensated.

BRIEF DESCRIPTION OF THE DRAWINGS

The invention will be described in more detail with reference to the drawings, which by way of example show embodiments of the invention in a schematic manner.

FIG. 1 shows the position of the measuring joint in marine drilling equipment;

FIG. 2 shows on a larger scale than FIG. 1, a longitudinal section of an instrumented load-measuring marine riser joint according to the invention;

FIG. 3 shows a cross-section (along section III—III in FIG. 2) of the joint shown in FIG. 2;

FIG. 4 shows (on a smaller scale than FIG. 2) a development of the inner wall of an alternative load-transmitting element of the joint of FIG. 2;

FIG. 5 shows a cross-section (along section V—V in FIG. 4) of the development of the load-transmitting element shown in FIG. 4;

FIG. 6 shows (on a larger scale than FIG. 4) the arrangement of electric strain gauges glued to the bottom of a groove of the load-transmitting element shown in FIG. 4.

DESCRIPTION OF A PREFERRED EMBODIMENT

Figure 7:
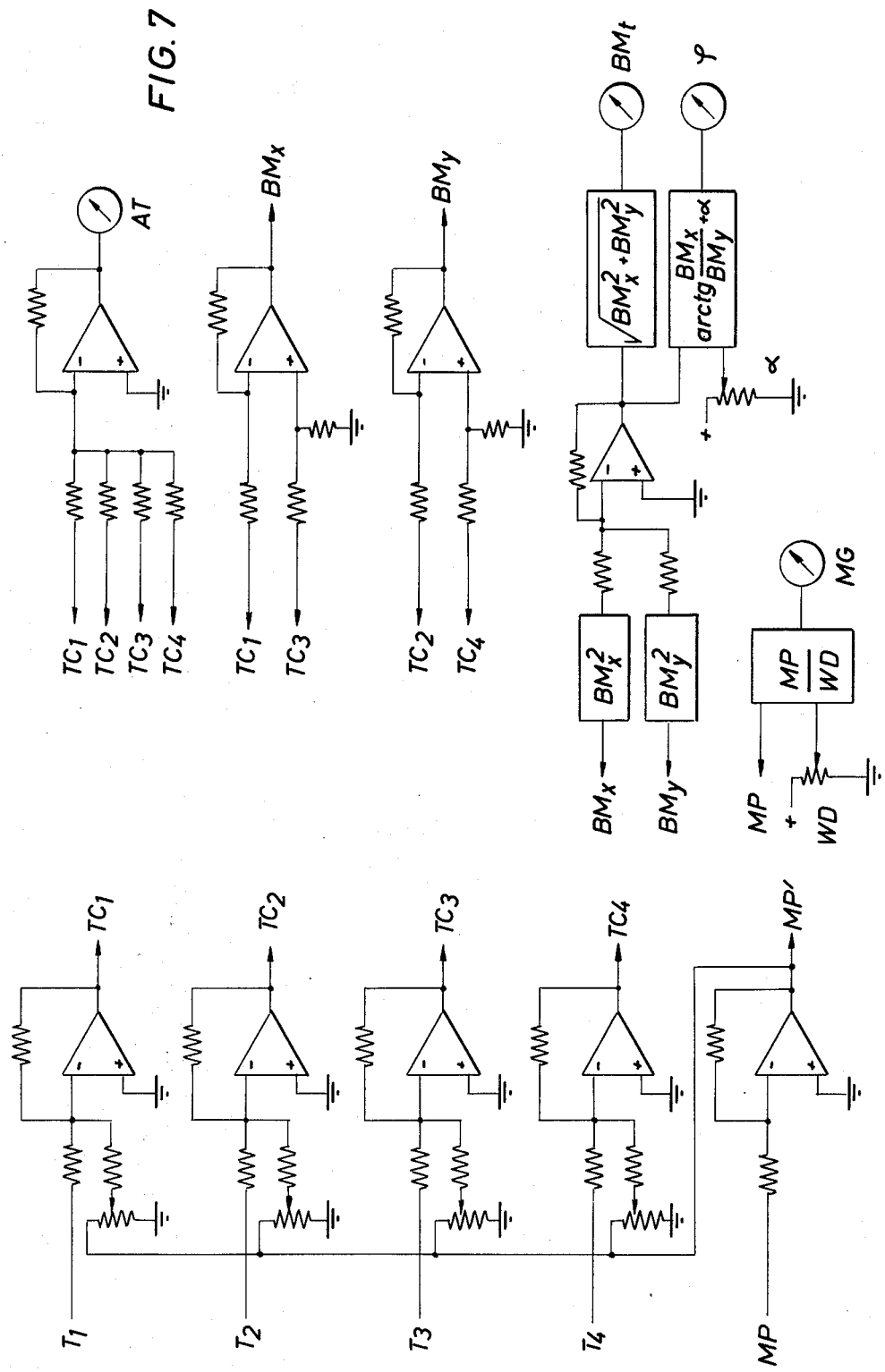
FIG. 7 shows a diagram of the electronic circuitry applied for transferring the signals obtained from the measuring equipment mounted on the joint according to the invention, into data indicating the load condition of the joint.

The floating vessel 1 (shown in FIG. 1) carries a drilling rig 2 and part of the other equipment necessary for marine drilling. Marine drilling equipment is known per se and therefore not shown in the drawing, with the exception, however, of the marine riser 3 and the submerged wellhead 4. This wellhead is situated at a level near the sea bottom 5, and the marine riser 3 extends from the wellhead 4 to a location near the sea level 6, and is supported by the vessel 1 in a manner known per se.

The marine riser 3 is connected at the lower end thereof to the wellhead 4 and consists of a plurality of large-diameter pipe or tubular sections 7 that are interconnected in end-to-end relationship. To allow such coupling of adjacent sections, each section comprises coupling means at both ends thereof such, for example, as threaded joints. Such coupling means are known per se, and therefore not described or shown in detail. This also applies for all other auxiliary equipment that may be included in the marine riser such as ball joints, buoyancy means, expansion joints, with the exception, however, of the instrumented load-measuring marine riser joint 8 that is arranged between sections 7 near the lower end of the marine riser 3. This marine riser joint 8 is shown in greater detail in FIGS. 2-5 of the drawings, and is applied for measuring loads or stresses exerted on the marine riser 1.

The marine riser joint shown in FIG. 2 comprises a first tubular element 9 and a second tubular element 10, which elements are co-axially arranged in spaced relationship.

The first tubular element 9 is provided at one end thereof with coupling means, e.g., threads 11, for coupling the joint 8 (either directly or indirectly) to a co-operating coupling means (not shown) of a marine riser section superimposed on the joint. Any type of coupling means may be used for the purpose. The lower end of the first tubular element 9 carries a flange 12.

The second tubular element 10 is provided at the lower end thereof with coupling means 13 for coupling the joint 8 (either directly or indirectly) to a co-operating coupling means (not shown) of a marine riser section arranged directly below the joint. Any type of coupling means may be used for the purpose. The upper end of the second tubular element 10 carries a flange 14.

A load-transmitting element 15 is arranged between the flanges 12 and 14 of the tubular elements 9 and 10, respectively. The load-transmitting element 15 is connected to the flanges through the intermediary of bolts 16 (only one bolt being shown in each flange) which bolts transmit, in co-operation with the element 15, any load exerted on the first tubular member 9 to the second tubular member 10. To measure the loads passing through the load-transmitting element 15, this element carries suitable load-measuring or load-sensing means (not shown) as will be explained hereinafter.

A third tubular element 17 is arranged between the first and second tubular elements 9 and 10 in a fluid-tight manner to allow any fluid flowing from the wellhead 4 to pass upwards into the marine riser 3 without any leakage and to protect the inner wall of the load-transmitting element 15 against damage by equipment passing through the marine riser. The upper end of the third tubular element 17 is thereto sealingly guided in a cylindrical depression 18 of the first tubular element 9, whereas the lower end of the element 17 is sealingly guided in the cylindrical depression 19 of the second tubular element 10. Sealing rings 20 and 21 are arranged for that purpose. Thus, the third tubular element 17 is allowed to carry out relative displacements with respect to the elements 9 and 10, in a manner such that elongation of the element 17 resulting from temperature increase thereof by the fluid flowing therethrough, will not exert any load on the elements 9 and 10. That is, the length of element 17 is less than the distance between the shoulders of depressions 18 and 19.

The annular slit between the element 9 and the element 17, as well as the annular slit between the element 10 and the element 17 may contain a compressible rubber composition (not shown) to prevent entry of dirt therein, which dirt might settle within the slits and prevent relative displacements between the elements 9 and 17, and between the elements 10 and 17.

The load-transmitting element 15 consists of a tubular element, on which load measuring elements are attached. Such elements may consist of electric strain gauges, like elements 27 through 30 of FIG. 6, that are glued to the outer or inner wall of the element 15 for measuring the elongation (or compression) thereof at various locations distributed along the circumference of the element 15. The strain gauges are electrically connected in a well-known manner to suitable amplifying means (not shown) and the resulting signals are passed on to the vessel 1 through a suitable electric cable (not shown). All such equipment is known per se and therefore not shown in the drawings.

The load-transmitting element 15 is designed for directly measuring the axial load exerted on this element. It will be appreciated that the measuring results obtained have to be compensated for temperature differences, since the electronic circuit is tested and adjusted at the temperature prevailing at the surface of the earth, but used at a relatively low temperature at underwater locations, which temperatures vary with the operational depth at each individual location.

To obviate temperature compensations, the load-transmitting element of the joint according to the invention may be designed in a manner such that the axial load passing therethrough creates a pure shear load in particular locations of the load-transmitting elements. Measuring these shear loads by means of a pair of strain gauges arranged at 45° with respect to the direction of the shear load automatically compensates the measuring results for temperature differences.

A load-transmitting element designed for the above purpose is shown in FIGS. 4 and 5. This element is a tubular element with external dimensions equal to those of the load-transmitting element 15 shown in FIG. 2, and can be inserted between the elements 9 and 10 in FIG. 2 to replace the element 15 shown in this FIG. 2.

For a schematic description of this alternative load-transmitting element 22, a development of the inner wall thereof is shown in FIG. 4 of the drawings. FIG. 5 shows a cross section of this development taken along the section V—V in FIG. 4.

It will be appreciated that the difference between the load-transmitting element 15 of FIG. 2 and the alternative element 22 of FIG. 4 exists in the presence of openings 23 and grooves 24. These grooves form areas of reduced wall thickness and the arrangement of the openings 23 and the grooves 24 is such that interdigitating areas 25 and 26, having the original wall thickness of the element 22, are being formed thereby. An axial load that is transmitted from the lower area 26 to the upper area 25 then creates pure shear forces in the grooves 24. To measure the magnitude of these forces in each groove 24, each pair of adjacent grooves 24', 24" (see FIG. 6) has glued therein a pair of electric strain gauges 27, 28 and 29, 30. These four strain gauges are electrically coupled in a bridge circuit and the resulting signal obtained therefrom is representative for the sum of the shear forces in the two adjacent grooves 24', 24" and free from temperature influences. Since the load-transmitting element 22 has four pairs of adjacent grooves, each group of four strain gauges in a pair of adjacent grooves measures that part of the load that passes through a quadrant of the cross-section of the load-transmitting element. The quadrants I-IV shown in FIG. 4 in relation to the element 22 correspond with the quadrants I-IV shown in FIG. 3 in relation to the load-transmitting element 15 of which element 22 is an alternative.

The manner in which the measured data resulting from the four quadrants may be combined to obtain the value of the average tension in the marine riser joint according to the invention will now be explained with reference to the electronic block diagram shown in FIG. 7 of the drawings. It will also be shown in which manner the maximum bending moment to which the joint is subjected may be ascertained.

The signals that are obtained from the measuring joint shown in FIGS. 2 and 3 (which may alternatively be equipped with the load-transmitting element 22 shown in FIGS. 4-6) are transmitted to the vessel 1 (see FIG. 1) in one of the manners known per se.

The assembly of the electric strain gauges in each quadrant delivers an electric signal that is representative for the average value of the axial load to which the body portion in each quadrant of the cross-section of the load-transmitting element is subjected. The four quadrants I, II, III and IV are indicated in FIG. 3 (and also in FIG. 4) and the axial loads passing through these quadrants are correspondent with the signals $T_1$, $T_2$, $T_3$ and $T_4$, respectively (see FIG. 7). Each signal is to be compensated for the part thereof resulting from the mud pressure exerted on the annular portion 26 (see FIG. 2) of the first tubular part 9. Thereto, the mud pressure inside the third tubular element 17 is measured (such as by a piezo-electric element), and the electric signal MP resulting from such measurement is multiplied by a factor to obtain a signal MP' that is representative for the upward force exerted by the mud in each of the quadrants I-IV on the ring surface 26. This signal is deducted from each of the signals $T_1$, $T_2$, $T_3$ and $T_4$ and the resulting signals $TC_1$ $TC_2$, $TC_3$ and $TC_4$, respectively, are representative for the average tension (or compression) in the quadrants I-IV, respectively. Addition of the signals $TC_1$, $TC_2$, $TC_3$ and $TC_4$ results in a signal AT that is representative for the average tension exerted on the lower end of the marine riser. The bending moments in X and Y direction can be obtained by combining the signals $TC_1$ and $TC_3$ to signal $BM_x$, and the signals $TC_2$ and $TC_4$ to signals $BM_y$, respectively. The signals $BM_x$ and $BM_y$ can be combined for calculating the maximum bending moment $BM_t$ and the angle $\phi$ thereof with respect to a heading $\alpha$ of the wellhead 4.

Finally, the mud gradient MG can continuously be read off by the operator, by dividing the signal MP' (which is representative for the mud pressure at the level of the third tubular element 17) by a factor WD that is representative for the depth at which the element 17 is submerged below the sea level 6.

It will be appreciated that the marine riser joint according to the invention allows the drilling operator to continuously watch the load condition of the marine riser, and to take any steps instantaneously that are required to prevent overloading of the said riser.

If desired, more than one instrumented joint according to the invention may be used in a marine riser. These joints may be situated close to each other (in order to duplicate the measuring results for safety reasons) and/or be distributed over the height of the riser. Preferably, at least one of the joints is arranged near or at the lower end of the riser, or in any tubular extension thereof that forms a connection between the marine riser and the wellhead, or between the wellhead and the well.

It will be appreciated that the invention is not limited to the use of bolts 16 for securing the load-transmitting element 15 to the first and second tubular elements 9 and 10. Any other means suitable for the purpose may be applied. Preferably, such means are adapted for transmitting the load to the cross section of the load-transmitting element 15 in a pattern equal to the load distribution over the cross section of the elements 9 and 10.

If desired, a protective sleeve may be arranged around the joint 8 to protect this joint and the signal amplifying means carried thereby against damage.

Although the arrangement of the load-transmitting element 15 having the inner wall thereof flush with the inner walls of the elements 9 and 10 is preferred, the invention is not limited to such construction. If desired, the element 15 may be arranged partly inside the elements 9 and 10. The signals $T_1$, $T_2$, $T_3$ and $T_4$ are then not compensated by the mud signal MP (which varies during the drilling operation), but by a signal WD representative for the waterdepth which is often constant for each individual drilling operation.

We claim as our invention:

1. Marine riser joint for measuring loads exerted on a marine riser, said joint comprising a first and a second tubular element, means on each of said first and second tubular elements for coupling the joint to sections of the marine riser, a third tubular element extending between the first and second tubular element and in fluid sealing contact therewith near its ends in a manner allowing relative axial displacement between the third element and at least one of the other elements, a load-transmitting element having a shear load area and forming a firm connection between the first and second tubular element, and stress measuring elements operatively carried by said load-transmitting element.

2. Marine riser joint according to claim 1, wherein the load-transmitting element is formed by a fourth tubular element having the wall thereof positioned concentric to the third tubular element, and comprising areas of reduced wall thickness, which areas extend substantially parallel to the axis of the fourth tubular element, openings in the wall of said fourth tubular element, each opening adjoining two of said areas in a manner such that the said areas are subjected to shearing stresses only when the fourth tubular element is subjected to a tensile load in the direction of the axis thereof, and means for measuring shearing stress in a plurality of said areas.

3. Marine riser joint according to claim 2, wherein the areas of reduced wall thickness are formed by grooves in the wall of the fourth tubular element.

4. Marine riser joint according to claim 3, having the grooves positioned in the inner wall of the fourth tubular element.

5. Marine riser joint according to claim 1 having the inner part of the wall of the third tubular element flush with the inner parts of the walls of the first and second tubular elements and comprising means for generating a signal that is representative for the compressive load exerted on the tubular element.

6. Marine riser joint according to claim 1, wherein the stress measuring elements consist of electric strain gauges.

* * * * *